Sept. 20, 1966   H. A. JULIEN ETAL   3,273,551
CYLINDER INLET PASSAGE FOR AN INTERNAL COMBUSTION ENGINE
Filed Sept. 30, 1964   2 Sheets-Sheet 1

INVENTORS
Harry A. Julien, &
BY Carl J. Robinson

J. L. Carpenter
ATTORNEY

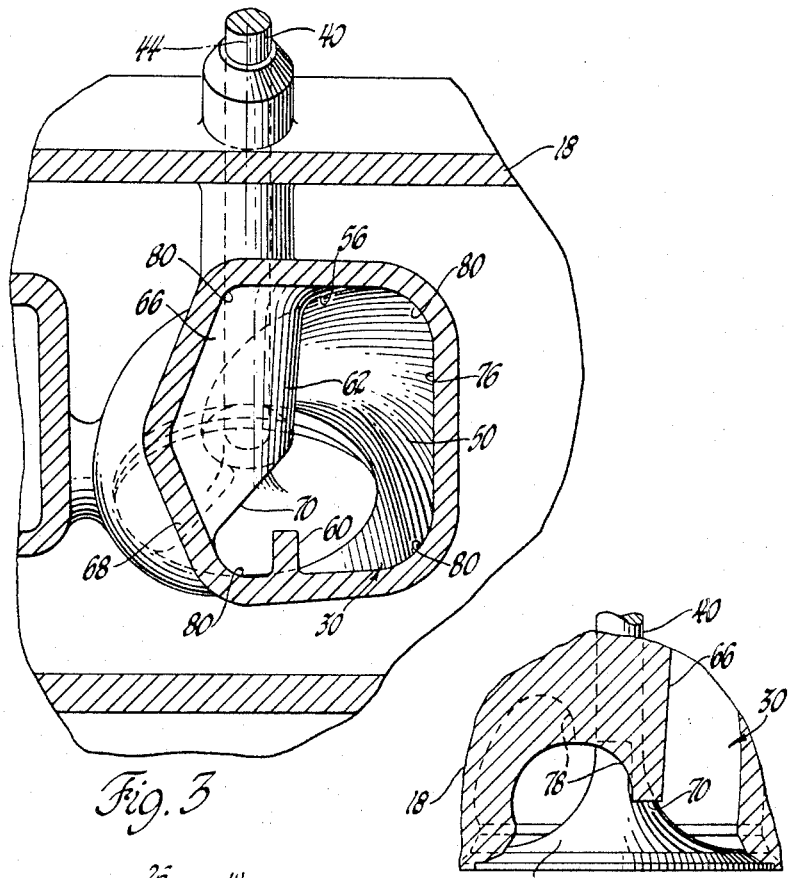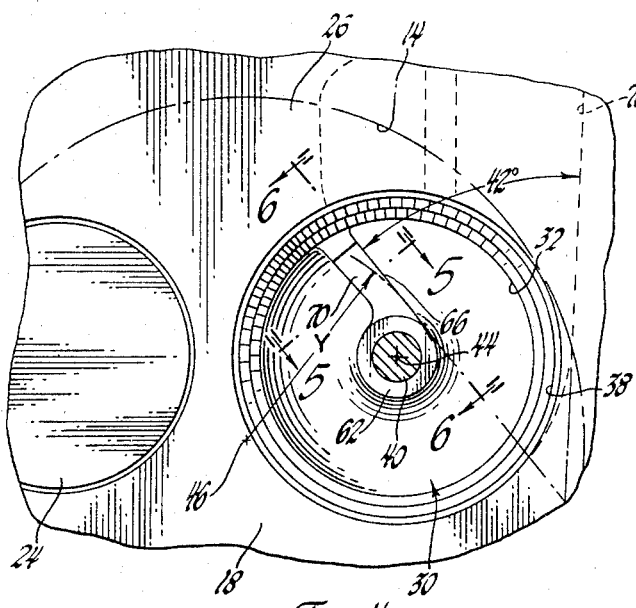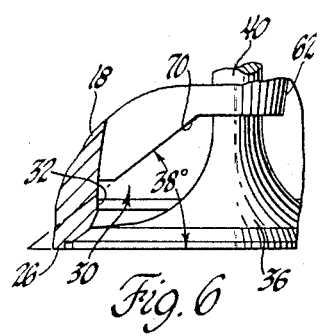

United States Patent Office 3,273,551
Patented Sept. 20, 1966

3,273,551
CYLINDER INLET PASSAGE FOR AN INTERNAL COMBUSTION ENGINE
Harry A. Julien, Oxford, and Carl J. Robinson, Pontiac, Mich., assignors to General Motors Corporation, Detroit, Mich., a corporation of Delaware
Filed Sept. 30, 1964, Ser. No. 400,460
7 Claims. (Cl. 123—188)

This invention relates to internal combustion engines and, more particularly, to cylinder inlet passages for compression ignition engines which are adapted to create swirl in the air introduced into the engine cylinders.

In the design of internal combustion engines of the compression ignition type, the promotion of air swirl in the cylinder is particularly important. Unlike most spark ignition engines in which the fuel and air are mixed prior to their admission into the combustion chamber, the usual compression ignition engine utilizes injection of a fuel charge directly into the combustion chamber after a charge of air has been admitted and compressed. In order to obtain complete combustion, it is necessary that the fuel spray be finely atomized and thoroughly mixed with the air present in the combustion chamber during the brief interval in which combustion is taking place. Considerable work has been done in developing combustion chamber configurations and inlet port shapes to obtain a high degree of swirl of the air introduced into the combustion chamber in order to obtain the desired degree of mixing of the fuel and air during the combustion process.

In the case of the instant invention, a relatively short inlet passage has been developed for use in an engine having a flat cylinder head surface and an inlet valve with its axis parallel to the axis of the engine cylinder. This passage arrangement has proven to impart a high degree of swirl to the inlet air and to contribute effectively to the excellent combustion characteristic of the engines in which it is used.

A feature of this invention is that the inlet passage includes a generally circular throat portion opening into the engine cylinder and adapted to be closed by an inlet valve and further has an entrance portion spaced from the throat portion, offset from the valve axis and which is connected with the throat portion by a fluid flow path extending around one side of the valve axis and blending into the throat portion in a descending spiral configuration.

Another feature of this invention is that the fluid flow path is partially defined by a diagonally extending wall generally parallel to and offset from the valve axis and blending tangentially into a guide boss, the lower portion of the wall forming a web connecting the guide boss with the throat portion and forming the opposite ends of the spiral configuration around the guide boss.

Still another feature of the invention is that a flow directing vane extends upwardly from the floor of the passage intermediate the entrance portion and the throat portion, said vane lying in a plane generally parallel to and offset from the valve axis so as to direct the flow of inlet air more smoothly into the throat entrance and prevent the cross flow of air currents in the vicinity of the passage floor.

These and other features and advantages of the invention will be more apparent from the following description and drawings which disclose, for purposes of illustration, one embodiment of the present invention and wherein:

FIGURE 3 is a cross sectional view of the cylinder head as shown in FIGURE 2 taken generally along the plane indicated by the lines 3—3.

FIGURE 4 is a partial lower plan view of a cylinder head incorporating the invention having the head of the inlet valve removed to disclose the construction of the inlet passage.

FIGURE 5 is a cross sectional view taken generally along a plane indicated by the lines 5—5 in FIGURE 4, and FIGURE 6 is a cross sectional view taken generally along a plane indicated by the lines 6—6 in FIGURE 4.

Figure 1:
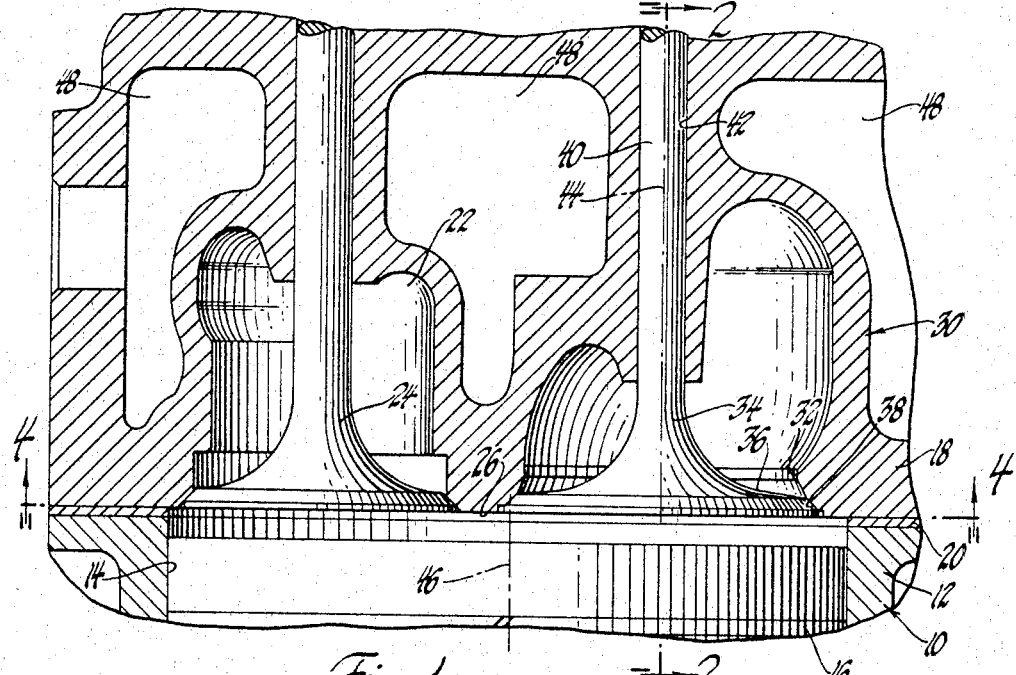
FIGURE 1 is a cross sectional view of a portion of an engine embodying the invention showing the cylinder head inlet and outlet valves and the adjacent portions of the cylinder and piston.

Referring now to the drawings wherein like reference numerals are used throughout the various views to designate like parts, numeral 10 indicates generally an engine of the compression ignition type having the usual cylinder block 12 and including at least one cylinder 14 in which the usual piston 16 is reciprocably disposed. Closing the end of the cylinder is a cylinder head 18 which may be sealingly connected with the block 12 by the usual combustion gasket 20. The cylinder head 18 includes an exhaust gas passage 22 opening into the cylinder 14 and having an exhaust valve 24 controllably closing the end which opens through the firing face 26 of the cylinder head.

Adjacent the exhaust passage, a cylinder inlet passage generally indicated by numeral 30 is provided having a throat portion 32 of generally circular cross section opening into the cylinder 14 and closed by the usual inlet valve 34. The inlet valve includes a head portion 36 seating on a valve seat 38 adjacent the throat 32. Valve 34 further includes a stem portion 40 which is movably carried in a valve guide bore 42 formed in the cylinder head 18 and has an axis 44 generally parallel to and offset from the central axis 46 of the cylinder 14. Cylinder head 18 may further include cooling water passages 48 surrounding the inlet and outlet passages.

Figure 2:
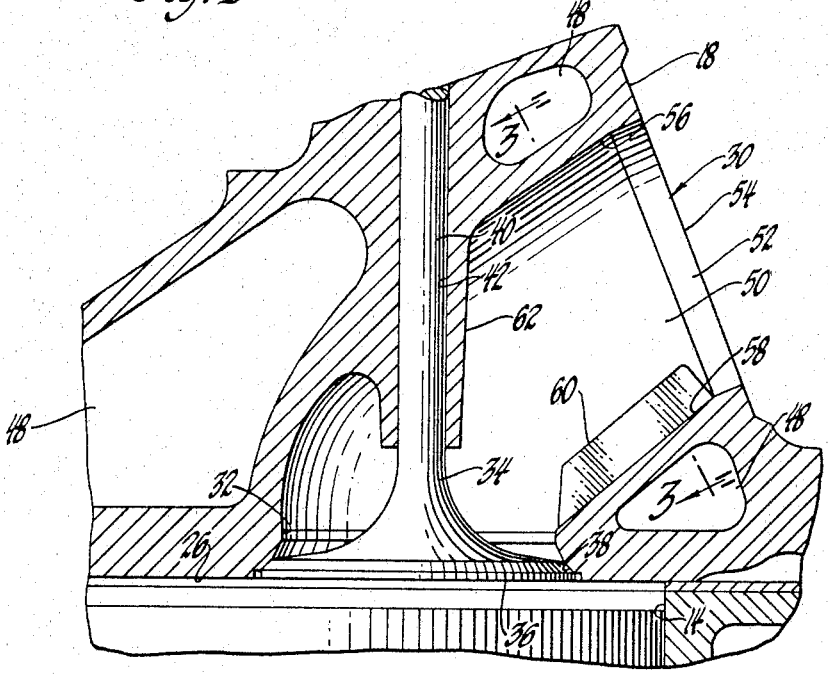
FIGURE 2 is a cross sectional view of the inlet port portion taken generally along a plane indicated by the lines 2—2 in FIGURE 1.

The general configuration of inlet passage 30 is more clearly seen in FIGURE 2 to include an angularly upwardly extending flow path 50 connecting the throat portion 32 with an entrance portion 52 opening from an outer surface 54 of the cylinder head which is adapted to receive an inlet manifold (not shown). Flow path 50 is partially defined by an upwardly sloping roof 56 and a floor 58, generally parallel to the roof. A flow directing vane 60 projects upwardly from the floor 58 a predetermined distance and extends along the floor for substantially its total length between the entrance portion 52 and the throat portion 32. A guide boss 62, which includes valve guide bore 42, extends vertically downwardly from the roof 56 to a predetermined point intermediate the roof and the valve throat 32.

As seen in FIGURE 3, flow path 50 is offset slightly to the right of the valve axis 44 and is further defined by a left side wall 66 extending generally vertically and blending tangentially into guide boss 62. A lower portion 68 of the side wall 66 is placed angularly, only for the purpose of altering the entrance portion configuration, to obtain clearance for a manifold mounting device (not shown). The bottom edge of the vertical portion of side wall 66 defines a web 70 (see FIGURES 4–6) which extends downwardly and outwardly from guide boss 62 to a point adjacent throat portion 32.

Located opposite left side wall 66 is right side wall 76, lying in a generally vertical plane extending substantially perpendicular to the outer manifold mounting surface 54 of the cylinder head. Side wall 76 extends from entrance portion 52 to a point opposite guide boss 62 at which point it is blended with roof 56 to form a descending spiral configuration extending around the guide boss and terminating at web 70 in a radius 78.

In order to provide ease of manufacture and encourage smooth air flow, the various wall portions are blended at their intersections with the roof and floor portions by generous radii 80.

In order to obtain optimum swirl of air entering the cylinder through the inlet passage herein described, it is essential that certain relationships be experimentally determined to provide the optimum conditions for each individual engine application. The height and location of the guide vane must be experimentally fixed to obtain ideal flow characteristics. In addition, the spacing of the guide boss above the plane of the throat portion and the angle of the connecting web with respect to the plane of the throat portion are particularly important as is the angle of the left side wall and web relative to the right side wall which determines the relative position of the web with respect to the axis of the cylinder.

In the particular embodiment disclosed herein, the passage entrance portion is divided by a plane perpendicular to the manifold mounting surface 54 and offset from the valve axis approximately one fourth the passage width. Guide vane 60 is parallel to and slightly to the left of the entrance portion dividing plane and approximately in line with the right edge of guide boss 62. The guide vane traverses substantially the length of the floor 58 and extends upwardly approximately one sixth the distance from the floor 58 to the roof 56 measured perpendicular to the direction of flow. Guide boss 62 projects downwardly approximately two thirds of the distance between the valve throat and the roof measured along the valve axis. The angle between the web 70 and the cylinder head firing face approximates 38 degrees, while the angle between the left and right side walls is approximately 42 degrees. The inlet passage is placed with respect to the cylinder axis 46 so that the web 70 is tangent to a radius Y drawn from the axis of the cylinder near the intersection of web 70 with guide boss 62.

With these particular relationships in the engine arrangement disclosed, optimum swirl conditions have been realized resulting in very good combustion and, consequently, low fuel consumption.

While one embodiment of an inlet port in accordance with the present invention has been shown and described, it should be understood that many changes and modifications could be made within the scope and spirit of the invention which is intended to be limited only by the language of the appended claims.

What is claimed is:

1. In an internal combustion engine, a cylinder, a cylinder head closing one end of the cylinder, means defining an inlet passage through the cylinder head and communicating with the cylinder, and a poppet inlet valve having a central axis and reciprocably disposed in the passage for controlling communication of the inlet passage with the cylinder, said inlet passage means being characterized by:

a throat portion of generally circular cross-section opening into the cylinder and adapted to be closed by the inlet valve;

an entrance portion spaced from the throat portion and offset from the valve axis;

means defining a fluid flow path extending from the entrance portion around one side of the valve axis and blending into the throat portion in a descending spiral configuration, said fluid flow path defining means including a valve guide boss surrounding the valve axis and extending into the flow path and a side wall extending tangentially from the guide boss to the entrance portion and terminating at its lower edge in a web connecting the guide boss with the throat portion, said web terminating the descending spiral configuration portion of the flow path; and a flow directing vane projecting into the flow path between the entrance portion and the throat portion, said vane lying in a plane offset from and parallel to the valve axis.

2. An internal combustion engine as defined in claim 1 wherein said cylinder includes a central axis and said inlet passage is located relative to the cylinder axis such that the web, near its intersection with the guide boss, is tangent to a radius drawn from the center of the cylinder.

3. In an internal combustion engine, a cylinder, a cylinder head closing one end of the cylinder, means defining an inlet passage through the cylinder head and communicating with the cylinder, and a poppet inlet valve having a central axis and reciprocably disposed in the passage for controlling communication of the inlet passage with the cylinder, said inlet passage means being characterized by:

a throat portion of generally circular cross-section opening into the cylinder and adapted to be closed by the inlet valve;

an entrance portion spaced from the throat portion and offset from the valve axis;

means defining a fluid flow path extending from the entrance portion around one side of the valve axis and blending into the throat portion in a descending spiral configuration; and a flow directing vane projecting into the flow path between the entrance portion and the throat portion, said vane lying in a plane offset from and parallel to the valve axis and extending into the flow path approximately one-sixth of the distance across the flow path measured perpendicular to the direction of flow, said vane extending in length a major portion of the distance between the entrance portion and the throat portion.

4. In an internal combustion engine, a cylinder, a cylinder head closing one end of the cylinder, means defining an inlet passage through the cylinder head and communicating with the cylinder, and a poppet inlet valve having a central axis and reciprocably disposed in the passage for controlling communication of the inlet passage with the cylinder, said inlet passage means being characterized by:

a throat portion of generally circular cross-section opening into the cylinder and adapted to be closed by the inlet valve;

an entrance portion spaced from the throat portion and offset from the valve axis;

means defining a fluid flow path extending from the entrance portion around one side of the valve axis and blending into the throat portion in a descending spiral configuration, said fluid flow path defining means including a valve guide boss surrounding the valve axis and extending into the flow path and a side wall extending tangentially from the guide boss to the entrance portion and terminating at its lower edge in a web connecting the guide boss with the throat portion, said web terminating the descending spiral configuration portion of the flow path; and a flow directing vane projecting into the flow path between the entrance portion and the throat portion, said vane lying in a plane offset from and parallel to the valve axis and extending into the flow path approximately one-sixth of the distance across the flow path measured perpendicular to the direction of flow, said vane extending in length a major portion of the distance between the entrance portion and the throat portion.

5. In an internal combustion engine, a cylinder, a cylinder head closing one end of the cylinder, means defining an inlet passage through the cylinder head and communicating with the cylinder, and a poppet inlet valve having a central axis and reciprocably disposed in the passage for controlling communication of the inlet passage with the cylinder, said inlet passage means being characterized by:
a throat portion of generally circular cross-section opening into the cylinder and adapted to be closed by the inlet valve;
an entrance portion spaced from the throat portion and offset from the valve axis; and
means defining a fluid flow path extending from the entrance portion around one side of the valve axis and blending into the throat portion in a descending spiral configuration, said fluid flow path defining means including a valve guide boss surrounding the valve axis and extending into the flow path and a side wall extending tangentially from the guide boss to the entrance portion and terminating at its lower edge in a web connecting the guide boss with the throat portion, said web terminating the descending spiral configuration portion of the flow path.

6. An internal combustion engine as defined in claim 5 wherein said cylinder includes a central axis and said inlet passage is located relative to the cylinder axis such that the web, near its intersection with the guide boss, is tangent to a radius drawn from the center of the cylinder.

7. In an internal combustion engine, a cylinder having a central axis, a cylinder head closing one end of the cylinder, means defining an inlet passage through the cylinder head and communicating with the cylinder, and a poppet inlet valve having a central axis and reciprocably disposed in the passage for controlling communication of the inlet passage with the cylinder, said inlet passage means being characterized by:
a throat portion of generally circular cross-section, concentric with the valve axis and opening into the cylinder, said throat portion being adapted to be closed by the inlet valve;
an entrance portion spaced above the throat portion and offset from the valve axis;
a roof sloping downwardly from the entrance portion in the direction of the valve axis;
a valve guide boss surrounding the valve axis and depending from the roof to a point generally intermediate the roof and the throat portion;
a first side wall extending tangentially from the guide boss to the entrance portion and smoothly blended with the roof, said first side wall terminating in a web connecting the lower edge of the guide boss with the throat portion;
a second side wall in opposed relation to the first side wall and extending from the entrance portion generally toward the valve seat, the second side wall and the roof being blended together opposite the guide boss and extending around the guide boss in a descending spiral terminating at the web and blended thereinto slightly above the lower edge thereof;
a floor blended into the side walls and extending from the entrance portion generally downwardly to the throat portion; and
a flow directing vane projecting upwardly from the floor and extending therealong for a major portion of its length, said vane lying generally parallel to the second side wall and located in a plane generally parallel to and offset from the axis of the valve in the direction of the second side wall.

References Cited by the Examiner
UNITED STATES PATENTS

| | | | |
|---|---|---|---|
| 2,921,571 | 1/1960 | Vogel et al. | 123—188 |
| 3,008,458 | 11/1961 | Eisele et al. | 123—188 X |
| 3,035,558 | 5/1962 | Wiebicke et al. | |
| 3,154,059 | 10/1964 | Witzky et al. | 123—188 X |

MARK NEWMAN, *Primary Examiner.*

FRED E. ENGELTHALER, *Examiner.*